United States Patent
van der Gucht

(10) Patent No.: US 9,128,406 B2
(45) Date of Patent: Sep. 8, 2015

(54) LINEAR LED ARRAY FOR DIGITAL PRINTING APPARATUS

(71) Applicant: Xeikon IP BV, Eede (NL)

(72) Inventor: Romain Jan Victor Paul van der Gucht, Lint (BE)

(73) Assignee: Xeikon IP B.V., Eede (NL)

( * ) Notice: Subject to any disclaimer, the term of this patent is extended or adjusted under 35 U.S.C. 154(b) by 0 days.

(21) Appl. No.: 14/047,340

(22) Filed: Oct. 7, 2013

(65) Prior Publication Data

US 2014/0111592 A1 Apr. 24, 2014

(30) Foreign Application Priority Data

Oct. 19, 2012 (EP) .................................. 12189237

(51) Int. Cl.
| | |
|---|---|
| *B41J 2/435* | (2006.01) |
| *B41J 2/47* | (2006.01) |
| *G03G 15/04* | (2006.01) |
| *B41J 2/45* | (2006.01) |
| *G06K 15/12* | (2006.01) |
| *H05B 37/02* | (2006.01) |

(52) U.S. Cl.
CPC ............. *G03G 15/04054* (2013.01); *B41J 2/45* (2013.01); *G06K 15/1242* (2013.01); *H05B 37/0254* (2013.01)

(58) Field of Classification Search
USPC ......... 347/128, 130, 132, 141, 142, 145, 148, 347/162, 234, 237, 238, 247, 248
See application file for complete search history.

(56) References Cited

U.S. PATENT DOCUMENTS

| | | | |
|---|---|---|---|
| 4,899,184 A | 2/1990 | Leskell et al. | |
| 5,926,201 A * | 7/1999 | Fleming et al. | 347/237 |
| 7,898,562 B2 * | 3/2011 | Matsuoka et al. | 347/252 |
| 2005/0263718 A1 * | 12/2005 | Tsujino et al. | 250/483.1 |
| 2009/0060545 A1 | 3/2009 | Matsuoka | |
| 2010/0097437 A1 * | 4/2010 | Nagumo | 347/237 |

FOREIGN PATENT DOCUMENTS

JP 2007216540 A * 8/2007 ................. B41J 2/44

* cited by examiner

*Primary Examiner* — Hai C Pham
(74) *Attorney, Agent, or Firm* — The Webb Law Firm

(57) ABSTRACT

Disclosed is an array of light emitting semiconductor components for use in a digital printer. Each component includes a driver and at least one light emitting device. The array includes data buses connecting to first subsets of components, forming a first partition of said component. The array further includes auxiliary buses connecting to second subsets of components, forming a second partition of the components. The first partition and the second partition are chosen such that each component can be uniquely identified by the subset of the first and second partition to which it belongs. The data buses are configured to supply instructions to the first subsets of components. Each component is configured to extract instructions on the basis of its membership of a particular subset according to the second partition.

9 Claims, 5 Drawing Sheets

Figure 3

| | slot 0 | slot 1 | slot 2 | slot 3 | |
|---|---|---|---|---|---|
| $D_0$ | $data_a$ | $data_b$ | $data_c$ | $data_d$ | |
| $D_1$ | $data_e$ | $data_f$ | $data_g$ | $data_h$ | |
| $D_2$ | $data_i$ | $data_j$ | $data_k$ | $data_l$ | |
| $D_3$ | $data_m$ | $data_n$ | $data_o$ | $data_p$ | |
| $A_0$ | ACTIVE | INACTIVE | INACTIVE | INACTIVE | |
| $A_1$ | INACTIVE | ACTIVE | INACTIVE | INACTIVE | |
| $A_2$ | INACTIVE | INACTIVE | ACTIVE | INACTIVE | |
| $A_3$ | INACTIVE | INACTIVE | INACTIVE | ACTIVE | |
| | slot 0 | slot 1 | slot 2 | slot 3 | time → |

Figure 4

| | slot 0 | slot 1 | slot 2 | slot 3 |
|---|---|---|---|---|
| $D_0$ | $address_a$ | $address_b$ | $address_c$ | $address_d$ |
| $D_1$ | $address_e$ | $address_f$ | $address_g$ | $address_h$ |
| $D_2$ | $address_i$ | $address_j$ | $address_k$ | $address_l$ |
| $D_3$ | $address_m$ | $address_n$ | $address_o$ | $address_p$ |
| $A_0$ | ACTIVE | INACTIVE | INACTIVE | INACTIVE |
| $A_1$ | INACTIVE | ACTIVE | INACTIVE | INACTIVE |
| $A_2$ | INACTIVE | INACTIVE | ACTIVE | INACTIVE |
| $A_3$ | INACTIVE | INACTIVE | INACTIVE | ACTIVE | time →

LINEAR LED ARRAY FOR DIGITAL PRINTING APPARATUS

CROSS-REFERENCED TO RELATED APPLICATION

This application claims priority to European Patent Application No. 12189237.6 filed Oct. 19, 2012, the disclosure of which is hereby incorporated by reference in its entirety.

BACKGROUND OF THE INVENTION

1. Field of the Invention

The present invention relates to the field of digital printing, in particular to linear LED arrays for use in digital printing apparatus.

2. Description of Related Art

In known systems, an array of light emitting semiconductor components is supplied with information via a limited number of 8-bit parallel input interfaces, each input interface supplying a set of adjacent light emitting semiconductor components with light pattern data, the data being shifted through from one component to the next (a sort of store-and-forward scheme). Although this arrangement requires minimal wiring, it severely limits the achievable data rate.

It is an object of embodiments of the present invention to provide a linear array of light emitting semiconductor components that at least partially overcomes this disadvantage.

SUMMARY OF THE INVENTION

According to an aspect of the present invention, there is provided a linear array of light emitting semiconductor components for use in a digital printing apparatus, each light emitting semiconductor component comprising a driver and at least one light emitting device, the array comprising a plurality of data buses respectively connecting to a first plurality of subsets of the light emitting semiconductor components, the first plurality of subsets forming a first partition of the light emitting semiconductor components; the array further comprising a plurality of auxiliary buses respectively connecting to a second plurality of subsets of the light emitting semiconductor components, the second plurality of subsets forming a second partition of the light emitting semiconductor components; wherein the first partition and the second partition are chosen such that each one of the light emitting semiconductor components can be uniquely identified by the subset of the first partition and the subset of the second partition to which it belongs; wherein the plurality of data buses is configured to supply instructions to the first plurality of subsets of the light emitting semiconductor components; and wherein each of the light emitting semiconductor components is configured to extract instructions on the basis of its membership of a particular subset according to the second partition.

The term "instructions", as used herein, is used broadly to designate any kind of information that may have to be sent to the light emitting semiconductor devices of the array. This information includes without limitation address allocation information, light pattern information, management information, and requests to return specific operational data.

It is an advantage of the present invention that it reduces the necessary wiring to operate a linear array of light emitting semiconductor components. While bus topologies and star topologies each have their drawbacks, the present invention achieves an advantageous tradeoff by using two mutually orthogonal sets of buses.

Thanks to the reduction in the required number of wires, and elimination of the requirement of passing on data from one driver to the next, the improved array according to the present invention allows for the production of array modules which may be coupled end-to-end without leaving any gaps between them. In this way, a light emitting array can be assembled with a substantially greater total length than what was possible with previously known techniques. These modularly composed arrays allow for greater printing widths, for instance up to widths in the order of 1 m, while maintaining high printing speeds.

In an embodiment of the linear array according to the present invention, the plurality of auxiliary buses is adapted to signal an active state or an inactive state, the plurality of auxiliary buses is configured to cycle through a sequence of states in which only one of the plurality of auxiliary buses is signaling the active state, and the plurality of data buses is configured to supply an instruction for a particular light emitting semiconductor component in synchronization with the active state signal of the auxiliary bus to which the particular light emitting semiconductor component is connected.

In this embodiment, the auxiliary buses are used as "chip select" buses. It is an advantage of this embodiment that the auxiliary bus can be implemented as a relatively simple low-speed bus, while retaining the wiring reduction advantages of the invention.

In a particular embodiment, the plurality of data buses is further configured to supply respective address allocation instructions to the light emitting semiconductor components in synchronization with the active state signal of the respective auxiliary bus to which the light emitting semiconductor components are connected; the light emitting semiconductor components are adapted to retain an address allocated by the respective address allocation instructions; and instructions subsequent to the address allocation instructions include an address and are transmitted independently of the active state signal, each of the light emitting semiconductor components being configured to extract instructions by comparing the included address to the retained address.

It is a further advantage of this particular embodiment that the auxiliary buses are not required for sending instructions to the light emitting semiconductor components after the initial address assignment stage. This makes the auxiliary buses available for other uses, such as serving as a return path for bidirectional communication (establishing a "dual simplex" channel).

According to an aspect of the present invention, there is provided a digital printing apparatus comprising at least one array of light emitting semiconductor components as described above.

According to an aspect of the present invention, there is provided a method for transmitting instructions from a controller to a linear array of light emitting semiconductor components in a digital printing apparatus, each light emitting semiconductor component comprising a driver and at least one light emitting device, wherein the array comprises a plurality of data buses respectively connecting to a first plurality of subsets of the light emitting semiconductor components, the first plurality of subsets forming a first partition of the light emitting semiconductor components; wherein the array comprises a plurality of auxiliary buses respectively connecting to a second plurality of subsets of the light emitting semiconductor components, the second plurality of subsets forming a second partition of the light emitting semiconductor components; and wherein the first partition and the second partition are chosen such that each one of the light emitting semiconductor components can be uniquely identified by the subset of the first partition and the subset of the second partition to which it belongs; the method comprising: supplying instructions to the first plurality of subsets of the light emitting semiconductor components over the plurality of data buses; and extracting instructions at the light emitting semiconductor components on the basis of their membership of a particular subset according to the second partition.

In an embodiment of the method according to the present invention, the plurality of auxiliary buses is adapted to signal an active state or an inactive state, and the method further comprises: cycling the plurality of auxiliary buses through a sequence of states in which only one of the plurality of auxiliary buses is signaling the active state; and supplying an instruction for a particular light emitting semiconductor component over the plurality of data buses in synchronization with the active state signal of the auxiliary bus to which the particular light emitting semiconductor component is connected.

In a particular embodiment, the method further comprises: supplying address allocation instructions for particular light emitting semiconductor components over the plurality of data buses in synchronization with the active state signal of the auxiliary bus to which the particular light emitting semiconductor components are connected; retaining an address allocated by the address allocation instructions at the light emitting semiconductor components; transmitting instructions subsequent to the address allocation instructions over the plurality of data buses independently of the active state signal, the subsequent instructions including the retained address; and extracting instructions at the light emitting semiconductor components by comparing the included address to the retained address.

According to an aspect of the present invention, there is provided a computer program product comprising code means configured to cause a processor to carry out the method as described above.

The technical effect and advantages of the digital printing apparatus, method, and computer program product according to embodiments of the present invention correspond, mutatis mutandis, to those of the corresponding embodiments of the linear array of light emitting semiconductor components according to the present invention.

BRIEF DESCRIPTION OF THE DRAWINGS

These and other technical effects and advantages of embodiments of the invention will be described in more detail in connection with the accompanying figures, in which:

FIG. 3 provides an exemplary instruction signaling time line representing an embodiment of the present invention;

FIG. 4 provides an exemplary address signaling time line representing an embodiment of the present invention.

DESCRIPTION OF THE INVENTION

Known xerography processes operate either with "dry toner" or "liquid toner".

Dry toner consists of resin particles, having an average diameter of approximately 7-10 µm in most modern applications, which carry a small amount of pigmented substance, typically in the range of 2% to 10%. The resin may be a transparent polyester, a styrene acrylate copolymer, or another suitable polymer. The material properties of the beads make them prone to developing static electric charges, which allow them to be transported between different components of the printing system by the application of a suitable electric field.

In liquid toner, the imaging particles or marking particles are supplied as solid particles suspended in a carrier liquid. The imaging particles consist of pigment grains, typically embedded in a small bead of resin, with an average diameter of for instance 2 µm. A dispersant is added to the mix to avoid clustering of the toner particles. In order for the suspended particles to be susceptible to acceleration under the effect of an electric field (electrophoresis), they must be capable of retaining an electrical charge. This charge may be attained by the particles as a result of charge exchange between the particles and molecules of the carrier liquid, or it may be induced by an externally applied electric field. The carrier liquid may comprise any suitable liquids as is known in the art, and may include silicone fluids, hydrocarbon liquids and vegetable oils, or any combinations thereof. The carrier liquid may further contain variable amounts of charge control agent (CCA), wax, plasticizers, and other additives.

A digital printing system will now be described in connection with FIG. 1. Without loss of generality, the described printing system will be of the liquid toner type. The concept of the invention is equally applicable to digital printing systems of the dry toner type.

Figure 1:
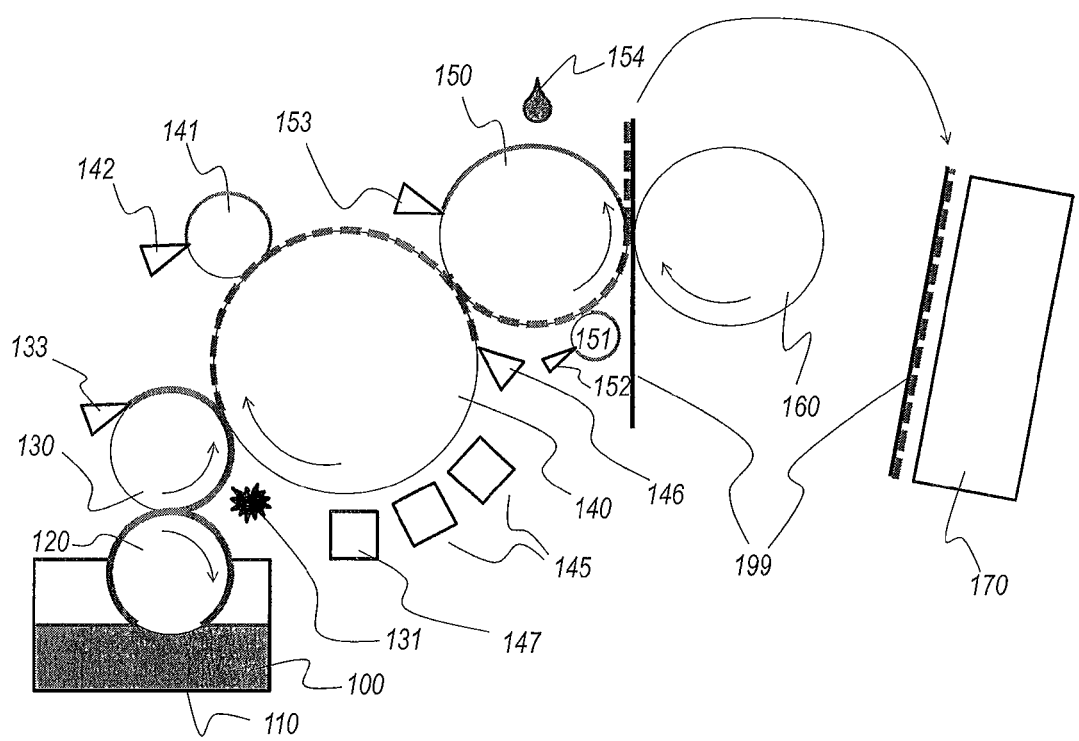
FIG. 1 presents a general digital printing system, in which the linear LED array according to the present invention can be used.

FIG. 1 schematically illustrates the application of an amount of toner 100, initially stored in a toner reservoir 110, via a toner supply member 120, a development member 130, an imaging member 140, and an optional intermediate member 150, to a substrate 199. Without loss of generality, the aforementioned members are all illustrated and described as rollers. The development member 130, imaging member 140, and intermediate member 150 all transfer part of the liquid toner 100 adhering to their surface to their successor; the part of the liquid toner 100 that remains present on the member's surface is removed after the transfer stage by appropriate means. These means are schematically illustrated as respective removal means 133, 146, 153. Excess carrier liquid present on the substrate 199 after printing is in part absorbed by the substrate 199, and may in part evaporate, depending on the type of substrate and the volatility of the carrier liquid, substantially during the substrate's stay in the fusing station 170; the remainder may be removed.

To facilitate removal of toner particles that may remain present on the surface of the intermediate member 150 after contact with the substrate 199, a small amount of carrier liquid or solvent 154 may be applied to the surface prior to its engagement with the removal means 153.

Film-like layers of liquid toner 100 as may be present on the various roller surfaces 120, 130 are shown in FIG. 1 as thick solid lines overlaid on the respective roller surfaces 120, 130. Where the toner 100 present on the respective roller surfaces 140, 150, or the substrate 199, represents a developed image, this is illustrated by a thick dashed line overlaid on the respective carrier. Where excess carrier liquid is removed from the main rollers 140, 150 by respective carrier liquid removal means 141-142 and 151-152, the film of carrier liquid is illustrated as a thinner solid line overlaid on the respective roller surface 141, 151. The skilled person shall appreciate that the "carrier liquid" as removed by the removal means 141-142 and 151-152 is preferably substantially free from toner particles, but that a full separation may be technically unfeasible.

Electrostatographic printing processes involve the creation of a visible image by the attraction of charged imaging particles or marking particles to charged sites present on a substrate. Such charged sites, forming a latent image, can be transiently supported on an imaging member 140 which may consist of photoconductors or pure dielectrics and may be rendered visible in situ or be transferred to another substrate to be developed in that location. The imaging member 140 is preferably a photoconductor roll, upon which the latent image is produced by selectively illuminating the roll with a sufficiently focused light source 147, such as a laser or LED array. In particular, the image forming stage may consist of providing a uniform electrostatic charge to the surface by means of a charging device 145, and then selectively discharging the uniform electrostatic charge by illumination by means of light source 147, to form the electrostatic latent image.

In the development stage, toner particles travel from a development member 130 supplied with a thin, film-like layer of liquid toner 100, onto the imaging member 140 that carries the latent image.

The electric force results from the electric field between the development roller (which is preferably set at a tension of approximately 400 V) and the photoconductor roller (which preferably presents electric potentials varying between 0 V and 600 V in different areas of the latent image).

In an optional subsequent step, the developed image is transferred from the photoconductor 140 onto an intermediate roller 150, which is preferably kept at a potential of approximately −200 V.

In the final transfer step, the developed image is transferred from the intermediate roller 150 (or from the photoconductor 140, if no intermediate roller is used), onto the substrate 199, which is preferably supported by a $2^{nd}$ transfer roller 160 that is kept at a more negative potential, preferably at or around −1200 V.

The focused light source 145 is preferably implemented as a linear array of light emitting semiconductor components (i.e. light emitting devices, provided with an associated driver for each individual light emitting device or for sets of for instance 2, 4, or 8 light emitting devices). The light emitting semiconductor components may optionally be grouped in modules. Hereinafter, the term "light emitting device" will be understood to designate the light source, in particular with reference to any light emitting semiconductor component, including a light emitting diode (LED) or a laser (e.g., a vertical cavity surface-emitting LASER, VCSEL).

To achieve high printing speeds while maintaining high printing resolutions, it is crucial to be able to control the focused light source 145 to present an adequate light pattern that is updated at a sufficiently high speed. In order to do this, the individual light emitting semiconductor components must be supplied with an adequate high data rate signal. Due to the geometry of the array (a linear assembly with a substantial width, preferably in the order of 1 m) and the required data rate (in the order of 500 Mb/s), it is a challenging task to provide a suitable lay-out for the signal lines that provide the light pattern data to the light emitting semiconductor components.

Due to the geometry of the array (or the modules making up the array), it is impractical to provide separate wiring to each individual driver (star topology).

A single bus system (i.e., a broadcast system) has the advantage of minimizing the amount of wiring, but it also has the disadvantage of requiring an addressing mechanism. Preferably, the individual drivers are mass produced as identical components, which leaves no room for providing them with a unique address in advance. Although it would also be possible to provide the light emitting semiconductor components with an address by means of dedicated additional pins that would receive a binary encoding of the address to be assigned, the need for additional die area and bonding wires renders this solution very costly.

Furthermore, the above systems require high clock frequencies to allow sufficiently high data rates, which results in high power consumption and substantial generation of heat. The generation of heat leads to thermal expansion of the components and the materials surrounding the components, which may in turn lead to undesired thermal stresses due to unequal thermal expansion coefficients. These issues have a negative impact on the life span of the known arrays.

The present invention overcomes this disadvantage by providing a set of data buses and a set of auxiliary buses, wherein the former are used to provide the light pattern information related to several different addresses, and the latter are used to allow groups of drivers to be selectively selected and optionally provided with an address.

The present invention thus provides a linear array of light emitting semiconductor components (each comprising a driver and a light emitting device), with a plurality of data buses and a plurality of auxiliary buses. The data buses connect to first subsets of the components, which subsets form a first partition of the components. The auxiliary buses connect to second subsets of the components, which subsets form a second partition of the components. The first partition and the second partition are chosen such that each one of the light emitting semiconductor components can be uniquely identified by the subset of the first partition and the subset of the second partition to which it belongs (i.e., they are orthogonal partitions). The data buses supply instructions to the first subsets of the components. The components extract instructions on the basis of their membership of a particular subset according to the second partition. By "extraction" is meant the process of discriminating between instructions that are intended for the component in question, and other instructions. The other instructions are normally expected to be instructions intended for other components attached to the same data bus.

Hereinafter, the term "bus" is meant to include either a serial bus or a parallel bus. A serial bus is a bus comprising a single serial data line and optionally a clock and/or a control line. These "lines" actually may be implemented as two wires, using a differential encoding. Such a design is common in high-speed Ethernet systems, such as the Serial Gigabit Media Independent Interface (SGMII). A parallel bus is a bus comprising multiple data lines, allowing transmission at the same data rate using a lower clock rate than for the corresponding serial bus, or transmission at a higher data rate using the same clock rate as for the corresponding serial bus.

The present invention is based inter alia on the insight of the inventors that by first partitioning the array into groups of components, each group being connected to a different data bus ($D_0$, $D_1$, $D_2$, $D_3$), and then orthogonally partitioning the array into groups of components, each group being connected to a different auxiliary bus ($A_0$, $A_1$, $A_2$, $A_3$), each component attached to a given data bus can be uniquely addressed (among its peers on the same data bus) via its auxiliary bus. Hence, an optimal trade-off can be achieved between wiring efficiency (by using a bus for data distribution), transmission speed (by using several separate data buses), and addressing issues (by providing addressing buses allocated in an orthogonal way).

Figure 2:
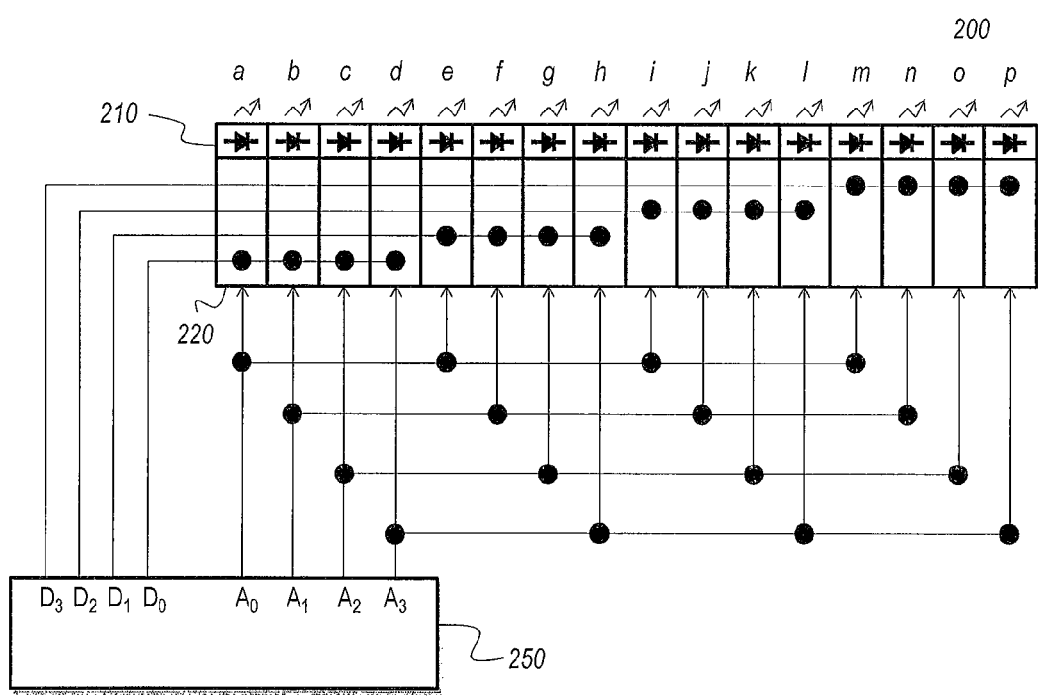
FIG. 2 presents a linear LED array according to an embodiment of the present invention.

FIG. 2 schematically illustrates a (partial) linear array of light emitting semiconductor components according to an embodiment of the present invention. Without loss of generality, 16 light sources 210 are illustrated, each with an associated driver 220. To facilitate referencing the light emitting semiconductor components, these have been provided with additional reference signs a-p. The choice of the number of auxiliary buses $A_0$-$A_3$ and the choice of the number of data buses $D_0$-$D_3$ are also made to fit the illustrated example and without loss of generality.

Four auxiliary buses $A_0$-$A_3$ are connected to as many subsets of the light emitting semiconductor components. In the illustrated case, $A_0$ is connected to components a, e, i, and m; $A_1$ is connected to components b, f, j, and n; $A_2$ is connected to components c, g, k, and o; and $A_3$ is connected to components d, h, l, and p.

Four data buses $D_0$-$D_3$ are connected to as many subsets of the light emitting semiconductor components, the partitioning into subsets being independent of the partitioning used for addressing buses. In the illustrated case, $D_0$ is connected to components a, b, c, and d; $D_1$ is connected to components e, f, g, and h; $D_2$ is connected to components i, j, k, and l; and $D_3$ is connected to components m, n, o, and p.

Any suitable device may transmit the relevant signals on the aforementioned buses $A_0$-$A_3$, $D_0$-$D_3$. FIG. 2 illustrates a controller 250, which is preferably a part of the processing hardware that controls the digital printing apparatus in which the LED array according to the invention is used.

It follows from the illustrated topology that any instructions transmitted on data bus $D_0$ will be received at the connected components a, b, c, and d. Each of these components is connected to a different auxiliary bus, in particular the respective buses $A_0$, $A_1$, $A_2$, and $A_3$. Hence, although the aforementioned components receive an identical set of instructions, containing aggregated instructions for the individual components reached by data bus $D_0$, each component will be capable of selecting the portion of the received data that pertains to it, because the locally unique auxiliary bus to which it is connected allows it to establish a locally unique identity. By "locally unique" is meant that no other component among those connected to the same data bus is connected to the same auxiliary bus.

A specific way to allow the components to extract relevant messages from the communications transmitted on their data bus will now be described with reference to FIG. 3. Each message period is divided into as many time slots as there are auxiliary buses (in the illustrated example, there are four time slots, corresponding to auxiliary buses $A_0$-$A_3$). The auxiliary buses are used to signal an "active" state or an "inactive" state, indicating whether the attached components are being addressed during that timeslot or not. Although each data bus $D_0$-$D_3$ broadcasts instructions to all the components attached to it, only one of those components will be activated by an auxiliary bus in any given time slot. Accordingly, it is possible to ensure that the right information is received by the right component by correctly synchronizing the data transmissions on the data buses $D_0$-$D_3$ with the activation signals on the auxiliary buses $A_0$-$A_3$.

For example, the instruction $data_a$ is transmitted during time slot 0 on data bus $D_0$. At that time, auxiliary bus $A_0$ is signaling the active state, while auxiliary buses $A_1$-$A_3$ are signaling the inactive state. It can easily be verified by referring to FIG. 2 that component a is the only component on data bus $D_0$ that will read an active state signal on its auxiliary bus during the transmission of this instruction.

Although the above mechanism may be used throughout the operation of the linear LED array, it is particularly advantageous to use it specifically for address assignment purposes. With reference to FIG. 4, it can easily be seen how the described mechanism can be used to send a unique address assignment instruction (denoted $address_x$) to each of the light emitting semiconductor components. Preferably, the components are adapted to store or retain an assigned address for future reference. For this purpose, they may be provided with a volatile or non-volatile memory.

In a particularly advantageous embodiment, the address assignment mechanism illustrated in FIG. 4 is used during an initial address assignment stage, and any subsequent communication towards the light emitting semiconductor components is performed by referring to the relevant address in an instruction transmitted over the relevant data bus, without using the auxiliary bus. This embodiment will now be further described with reference to FIG. 5.

Figure 5:
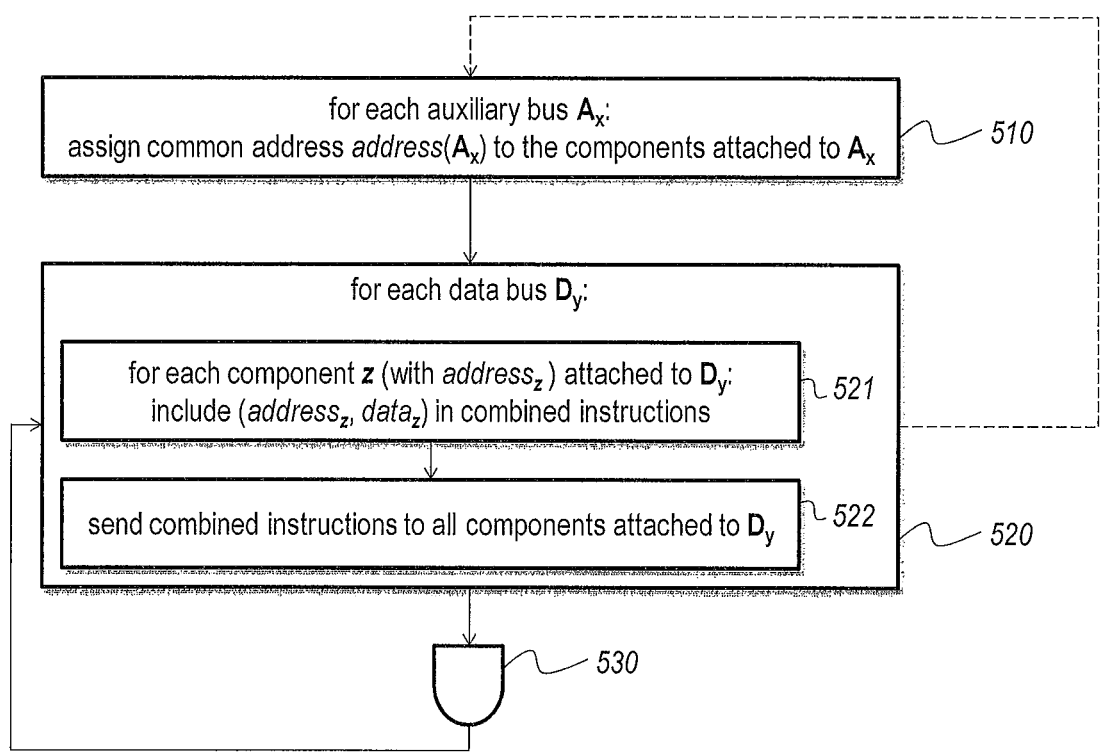
FIG. 5 provides a flow chart representing an embodiment of the present invention.

As shown in FIG. 5, unique addressing information is assigned to each one of a first plurality of subsets of light emitting semiconductor components during an initial phase 510. This first plurality of subsets corresponds to the subsets associated with the various different auxiliary buses $A_0$-$A_3$. Hence, all the components attached to a given auxiliary bus $A_x$ will be assigned the same address, designated as address $(A_x)$.

In a subsequent phase 520, which takes place after the completion of the initial phase 510, respective instructions are supplied to a second plurality of subsets of said light emitting semiconductor components. This second plurality of subsets corresponds to the subsets associated with the various different data buses $D_0$-$D_3$.

The instructions sent to a given data bus $D_y$ may include instructions for one or more components attached to that bus. In order to allow each attached component z to identify the instructions intended for it, the instructions may be structured in the form of ($address_z$, $data_z$) pairs, where $address_z$ denotes the address obtained by component z in the address assignment stage 510, and where $data_z$ denotes the instruction intended for component z. The method thus includes for each data bus $D_y$ the logical steps of assembling 521 the ($address_z$, $data_z$) pairs for all components attached to $D_y$, and transmitting 522 this assembled information over $D_y$. At the component, the relevant instructions are extracted by comparing the address including in the instructions to the address assigned to (and retained by) the component.

FIG. 5 symbolically indicates an optional additional delay step 530, after which the method returns to the previous step 520. This delay step 530 is included in the Figure to schematically illustrate the fact that the transmission of data is a timed repetitive process, whereas the address assignment is an initialization step, preferably occurring only once for a given operating session.

Preferably, the light emitting semiconductor components are also adapted to respond to an address reassignment instruction, in which case the flow chart returns to stage 510 for one or more of the auxiliary buses. This optional behavior is symbolically represented by the dashed arrow returning from step 520 to step 510.

The use of a two-stage approach as illustrated in FIG. 5 has the advantage of freeing up the auxiliary buses $A_0$-$A_3$ after the address assignment stage. Although these buses may be relatively low-bandwidth channels, they may be useful for various purposes. Accordingly, the auxiliary buses $A_0$-$A_3$ may be used as a shared return channel over which the light emitting semiconductor components send specific information back to the controller 250, preferably in response to a specific instruction requesting them to do so. The auxiliary buses $A_0$-$A_3$ may also be used as a shared interrupt line, allowing the attached light emitting semiconductor components to signal events or anomalies to the controller 250, which is preferably configured to respond by polling the components of the affected auxiliary bus for detailed status information.

Although the invention has been described hereinabove with respect to specific embodiments, the skilled person will appreciate that this is done to clarify and not to limit the invention. Where certain features have only been described with respect to embodiments of the array according to the invention, these features may be combined with embodiments of the method according to the invention with the same technical effects and advantages, and vice versa.

The invention claimed is:

1. A linear array of light emitting semiconductor components for use in a digital printing apparatus, each light emitting semiconductor components comprising a driver and at least one light emitting device,
    said array comprising a plurality of data buses respectively connecting to a first plurality of subsets of said light emitting semiconductor components, said first plurality of subsets forming a first partition of said light emitting semiconductor components;
    said array further comprising a plurality of auxiliary buses respectively connecting to a second plurality of subsets of said light emitting semiconductor components, said second plurality of subsets forming a second partition of said light emitting semiconductor components;
    wherein said first partition and said second partition are chosen such that each one of said light emitting semiconductor components can be uniquely identified by the subset of the first partition and the subset of the second partition to which it belongs;
    wherein said plurality of data buses is configured to supply instructions to said first plurality of subsets of said light emitting semiconductor components; and
    wherein each of said light emitting semiconductor components is configured to extract instructions on the basis of its membership of a particular subset according to said second partition;
    wherein said plurality of auxiliary buses is configured to signal an active state or an inactive state;
    wherein said plurality of data buses is further configured to supply respective address allocation instructions to said light emitting semiconductor components in synchronization with the active state signal of the respective auxiliary bus to which said light emitting semiconductor components are connected;
    wherein said light emitting semiconductor components are configured to retain an address allocated by said respective address allocation instructions; and
    wherein instructions subsequent to said address allocation instructions include an address and are transmitted independently of said active state signal, each of said light emitting semiconductor components being configured to extract instructions by comparing said included address to said retained address.

2. The linear array according to claim 1,
    wherein said plurality of auxiliary buses is configured to cycle through a sequence of states in which only one of said plurality of auxiliary buses is signaling said active state, and said plurality of data buses is configured to supply an instruction for a particular light emitting semiconductor component in synchronization with the active state signal of the auxiliary bus to which said particular light emitting semiconductor component is connected.

3. A digital printing apparatus comprising at least one array of light emitting semiconductor components according to claim 1.

4. A linear array of light emitting semiconductor components for use in a digital printing apparatus, each light emitting semiconductor component comprising a driver and at least one light emitting device,
    said array comprising a plurality of data buses respectively connecting to a first plurality of subsets of said light emitting semiconductor components, said first plurality of subsets forming a first partition of said light emitting semiconductor components;
    said array further comprising a plurality of auxiliary buses respectively connecting to a second plurality of subsets of said light emitting semiconductor components, said second plurality of subsets forming a second partition of said light emitting semiconductor components;
    wherein said first partition and said second partition are chosen such that each one of said light emitting semiconductor components can be uniquely identified by the subset of the first partition and the subset of the second partition to which it belongs;
    wherein said plurality of data buses is configured to supply instructions to said first plurality of subsets of said light emitting semiconductor components; and
    wherein each of said light emitting semiconductor components is configured to extract instructions on the basis of its membership of a particular subset according to said second partition;
    wherein said plurality of data buses is configured to supply respective address allocation instructions to said light emitting semiconductor components;
    wherein said light emitting semiconductor components are configured to retain an address allocated by said respective address allocation instructions; and
    wherein instructions subsequent to said address allocation instructions include an address, each of said light emitting semiconductor components being configured to extract instructions by comparing said included address to said retained address.

5. A digital printing apparatus comprising at least one array of light emitting semiconductor components according to claim 4.

6. A method for transmitting instructions from a controller to a linear array of light emitting semiconductor components in a digital printing apparatus, each light emitting semiconductor components comprising a driver and at least one light emitting device,
    wherein said array comprises a plurality of data buses respectively connecting to a first plurality of subsets of said light emitting semiconductor components, said first plurality of subsets forming a first partition of said light emitting semiconductor components;
    wherein said array comprises a plurality of auxiliary buses respectively connecting to a second plurality of subsets of said light emitting semiconductor components, said second plurality of subsets forming a second partition of said light emitting semiconductor components; and
    wherein said first partition and said second partition are chosen such that each one of said light emitting semiconductor components can be uniquely identified by the subset of the first partition and the subset of the second partition to which it belongs;
    said method comprising:
    supplying instructions to said first plurality of subsets of said light emitting semiconductor components over said plurality of data buses; and
    extracting instructions at said light emitting semiconductor components on the basis of their membership of a particular subset according to said second partition;

wherein said plurality of auxiliary buses is configured to signal an active state or an inactive state, said method further comprising:

supplying address allocation instructions for particular light emitting semiconductor components over said plurality of data buses in synchronization with the active state signal of the auxiliary bus to which said particular light emitting semiconductor components are connected;

retaining an address allocated by said address allocation instructions at said light emitting semiconductor components;

transmitting instructions subsequent to said address allocation instructions over said plurality of data buses independently of said active state signal, said subsequent instructions including said retained address; and extracting instructions at said light emitting semiconductor components by comparing said included address to said retained address.

7. The method according to claim 6, wherein said plurality of auxiliary buses is configured to signal an active state or an inactive state, said method further comprising:

cycling said plurality of auxiliary buses through a sequence of states in which only one of said plurality of auxiliary buses is signaling said active state; and supplying an instruction for a particular light emitting semiconductor components over said plurality of data buses in synchronization with the active state signal of the auxiliary bus to which said particular light emitting semiconductor component is connected.

8. A method for transmitting instructions from a controller to a linear array of light emitting semiconductor components in a digital printing apparatus, each light emitting semiconductor components comprising a driver and at least one light emitting device, wherein said array comprises a plurality of data buses respectively connecting to a first plurality of subsets of said light emitting semiconductor components, said first plurality of subsets forming a first partition of said light emitting semiconductor components;

wherein said array comprises a plurality of auxiliary buses respectively connecting to a second plurality of subsets of said light emitting semiconductor components, said second plurality of subsets forming a second partition of said light emitting semiconductor components; and wherein said first partition and said second partition are chosen such that each one of said light emitting semiconductor components can be uniquely identified by the subset of the first partition and the subset of the second partition to which it belongs;

said method comprising:

supplying instructions to said first plurality of subsets of said light emitting semiconductor components over said plurality of data buses; and extracting instructions at said light emitting semiconductor components on the basis of their membership of a particular subset according to said second partition;

said method further comprising:

supplying address allocation instructions for particular light emitting semiconductor components over said plurality of data buses;

retaining an address allocated by said address allocation instructions at said light emitting semiconductor components;

transmitting instructions subsequent to said address allocation instructions over said plurality of data buses, said subsequent instructions including said retained address; and extracting instructions at said light emitting semiconductor components by comparing said included address to said retained address.

9. A computer program product comprising code means configured to cause a processor to carry out the method of claim 8.

* * * * *